United States Patent
Mori et al.

(10) Patent No.: US 10,566,597 B2
(45) Date of Patent: Feb. 18, 2020

(54) BATTERY WIRING MODULE

(71) Applicant: Sumitomo Wiring Systems, Ltd., Yokkaichi, Mie (JP)

(72) Inventors: Ryota Mori, Mie (JP); Hiroshi Sato, Mie (JP); Hisayoshi Yaita, Mie (JP); Masami Suzuki, Mie (JP); Koki Kawamura, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 140 days.

(21) Appl. No.: 15/928,844

(22) Filed: Mar. 22, 2018

(65) Prior Publication Data

US 2018/0294463 A1 Oct. 11, 2018

(30) Foreign Application Priority Data

Apr. 11, 2017 (JP) .................................. 2017-078125

(51) Int. Cl.
*H01M 2/34* (2006.01)
*H01M 2/20* (2006.01)

(52) U.S. Cl.
CPC ............. *H01M 2/206* (2013.01); *H01M 2/34* (2013.01); *H01M 2220/20* (2013.01)

(58) Field of Classification Search
None
See application file for complete search history.

(56) References Cited

FOREIGN PATENT DOCUMENTS

JP 2014233160 A 12/2014

OTHER PUBLICATIONS

Ogasawara et al. (JP 2014233160 A, machine translation). (Year: 2014).*

* cited by examiner

*Primary Examiner* — Wojciech Haske
(74) *Attorney, Agent, or Firm* — Reising Ethington, P.C

(57) ABSTRACT

A battery wiring module that can keep an electrical wire from getting caught up when a cover portion is rotated and closed. In order to keep an electrical wire from sticking out from an electrical wire housing portion, a cover portion that partially covers an upper opening of the electrical wire housing portion is provided to a first side wall portion of an electrical wire housing portion with a hinge portion. The upper end of the first side wall portion is provided with a cover facing surface that faces the cover portion in a covering position in the vertical direction (a height direction Z), and a protruding portion that is adjacent to the cover facing surface and that protrudes higher than the cover facing surface.

2 Claims, 4 Drawing Sheets

BATTERY WIRING MODULE

CROSS REFERENCE TO RELATED APPLICATIONS

This application claims the priority of Japanese patent application JP2017-078125 filed on Apr. 11, 2017, the entire contents of which are incorporated herein.

TECHNICAL FIELD

The present invention relates to a battery wiring module that is to be attached to a high-voltage secondary battery for a vehicle.

BACKGROUND ART

As disclosed for example in JP 2014-233160A, a battery wiring module is attached to a high-voltage secondary battery that is mounted on a vehicle such as an electric vehicle or a hybrid vehicle as a power supply for driving the vehicle. A battery wiring module includes a bus bar that is electrically connected to an electrode of a secondary battery, an electrical wire that is connected to the bus bar, and a housing that houses the bus bar and the electrical wire. An electrical wire housing portion of the housing is formed in a groove shape having a pair of side wall portions facing each other, and either of the pair of side wall portions is provided with a cover portion rotatably with a hinge portion, the cover portion partially covering the electrical wire housing portion. The cover portion rotates around the hinge portion from an open state to a covering position, and in the covering position, the cover portion covers an upper opening of the electrical wire housing portion between the upper ends of the side wall portions. This cover portion keeps the electrical wire from sticking out from the electrical wire housing portion.

JP 2014-233160A is an example of related art.

In the above battery wiring module, if the electrical wire housed in the electrical wire housing portion has a tendency to bend, in some cases, the electrical wire may run on the side wall portion of the electrical wire housing portion to which the cover portion is connected. Due to that, there has been a risk that the electrical wire running on the side wall portion will be caught in the hinge portion when the cover portion is rotated to the covering position so as to close the cover portion.

The present design has been made to solve the above-mentioned problems, and an object thereof is to provide a battery wiring module that can keep the electrical wire from getting caught up when the cover portion is rotated and closed.

SUMMARY

A battery wiring module to solve the above-mentioned problem includes a housing to be attached to a secondary battery for a vehicle, the housing including an electrical wire housing portion including a first side wall portion and a second side wall portion that face each other, an electrical wire being housed between the first side wall portion and the second side wall portion, and a cover portion that is provided to the first side wall portion with a hinge portion, the cover portion being rotatable about the hinge portion to a covering position in which the cover portion reaches from an upper end of the first side wall portion to an upper end of the second side wall portion, partially covering the electrical wire housing portion, and the upper end of the first side wall portion is provided with a cover facing surface that faces the cover portion in the covering position in the vertical direction, and a protruding portion that is adjacent to the cover facing surface and that protrudes higher than the cover facing surface.

With this configuration, the protruding portion keeps the electrical wire from running on the cover facing surface, and as a result, the electrical wire can be kept from being caught between the cover facing surface and the cover portion or in the hinge portion when the cover portion is rotated to the covering position.

In the above-mentioned battery wiring module, the protruding portion may include a guiding portion configured to guide the electrical wire, when the electrical wire sticks out of the electrical wire housing portion beyond the protruding portion, above the protruding portion by moving the electrical wire along the rotation of the cover portion to the covering position side.

With this configuration, even if the electrical wire jumps over the protruding portion, only by rotating the cover portion to the covering position, the electrical wire can be returned into the electrical wire housing portion without getting caught up.

In the above-mentioned battery wiring module, an inclined surface that is inclined upward toward the electrical wire housing portion side may be formed on an end surface of the guiding portion on a side opposite to the electrical wire housing portion.

With this configuration, when the electrical wire sticking out in the direction away from the electrical wire housing portion from the protruding portion is moved along the rotation of the cover portion to the covering position side, the electrical wire can be easily guided above the protruding portion along the inclined surface, and as a result, the electrical wire can be better kept from getting caught up.

In the above battery wiring module, the guiding portion may extend away from the electrical wire housing portion to a position that coincides with the rotational axis of the hinge portion, or a position beyond the rotational axis in the direction.

With this configuration, the electrical wire can be easily guided above the protruding portion when the cover portion is rotated to the covering position, and as a result, the electrical wire can be better kept from getting caught up.

With the battery wiring module according to the present design, it is possible to keep the electrical wire from getting caught up when the cover portion is rotated and closed.

EMBODIMENTS

Figure 1:
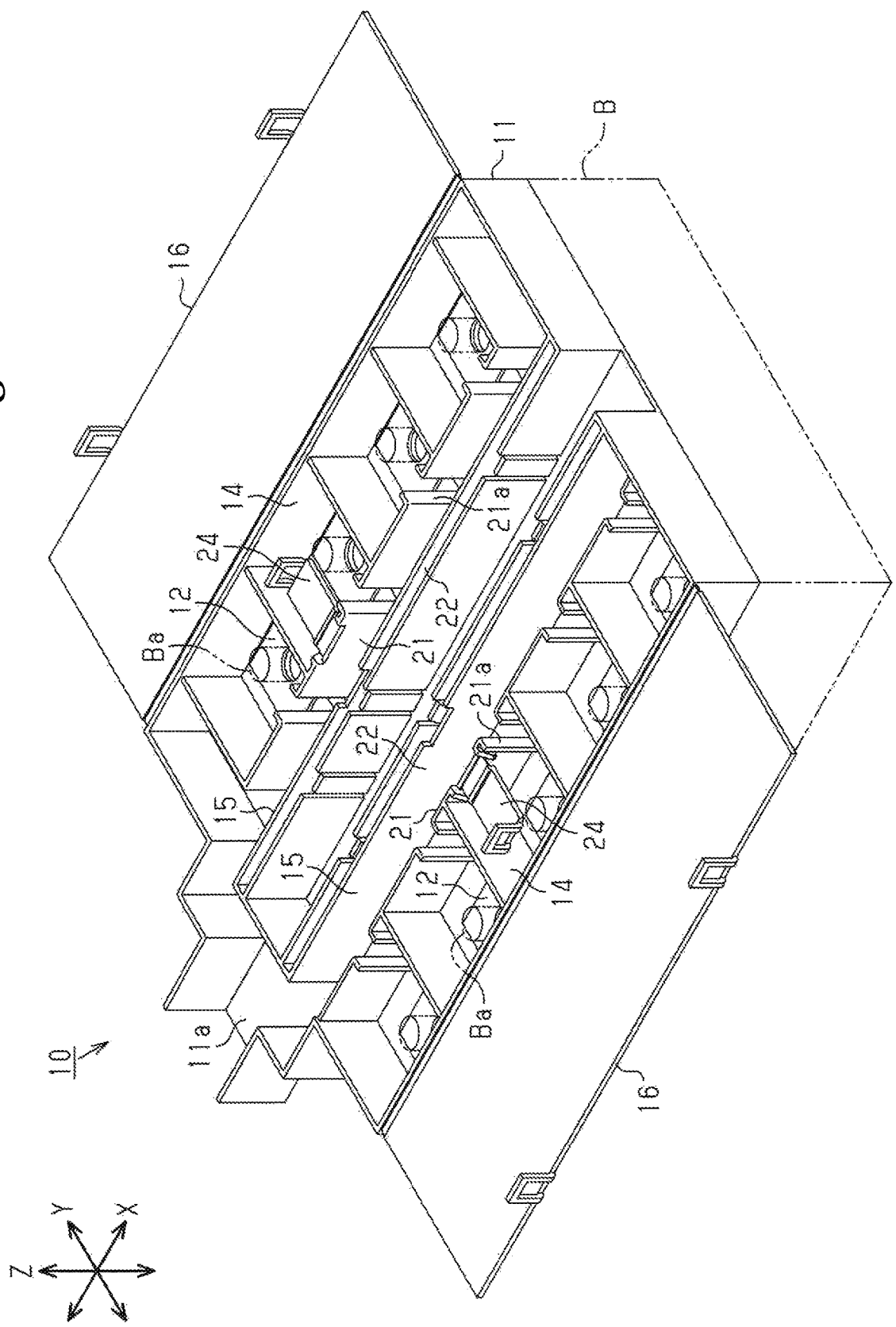
FIG. 1 is a perspective view of a battery wiring module according to one embodiment.

The following describes an embodiment of a battery wiring module with reference to FIGS. 1 to 5. In the following description, a depth direction X, a width direction Y, and a height direction Z of the battery wiring module are three directions that are orthogonal to each other (X, Y, and Z in the drawings). In the drawings, some structures may be exaggerated or simplified for illustrative reasons. In addition, the aspect ratio of individual parts may differ from their actual aspect ratio.

A battery wiring module 10 according to the present embodiment shown in FIG. 1 is to be attached to a high-voltage on-board secondary battery B that is mounted on a vehicle such as an electric vehicle or a hybrid vehicle. The secondary battery B supplies power to a motor (not shown) for driving the vehicle, and is charged using power generated by a motor or a generator, depending on the state of charge. The secondary battery B is configured as, for example, a battery module formed by stacking a plurality of plate-shaped batteries in the depth direction X. One end of secondary battery B in the depth direction X serves as a positive electrode, and the opposite end in the depth direction X serves as a negative electrode.

Figure 2:
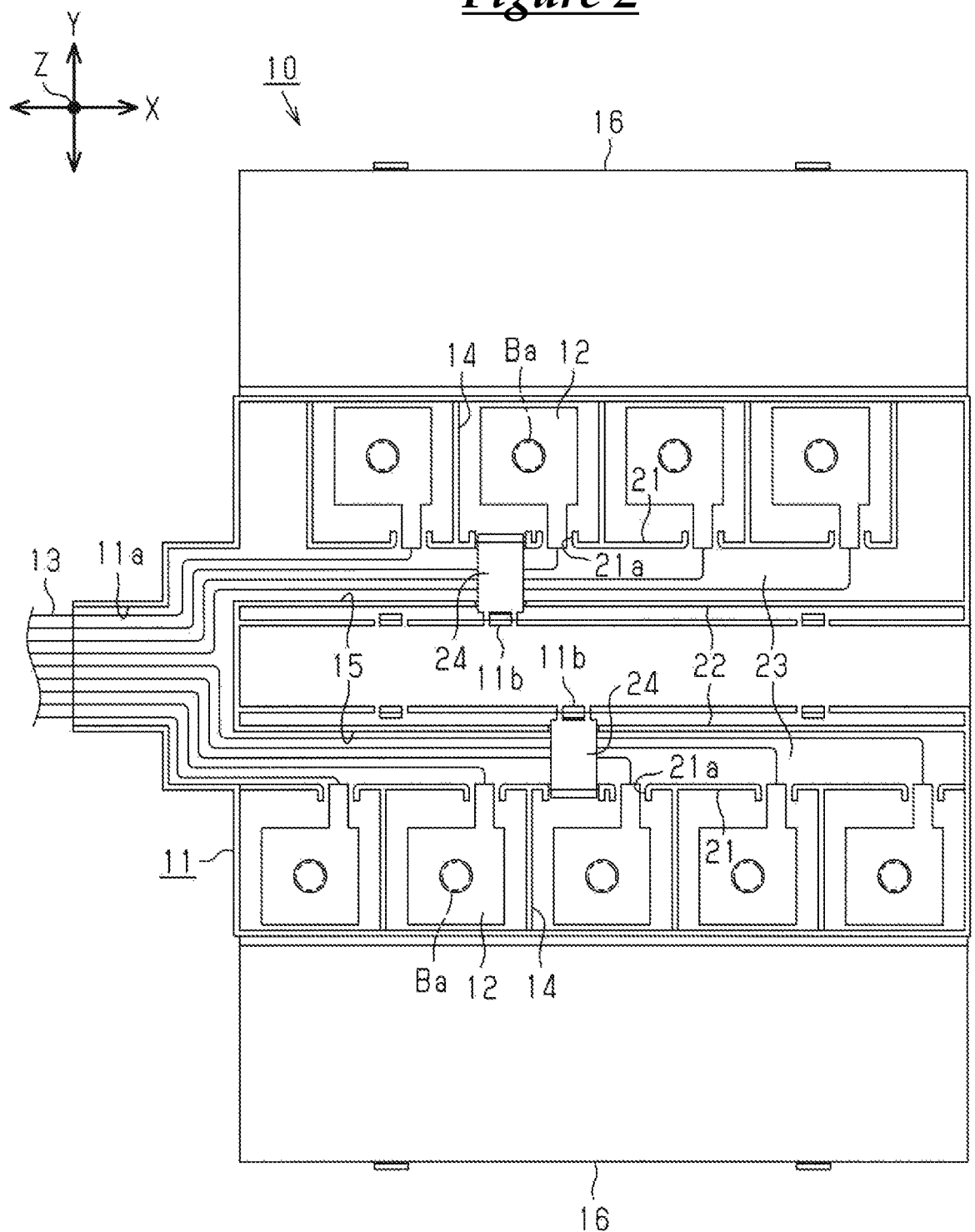
FIG. 2 is a plan view of a battery wiring module according to this embodiment.

As shown in FIGS. 1 and 2, the battery wiring module 10 includes a housing 11 that is attached to an upper portion of the secondary battery B, a plurality of bus bars 12 that are housed in the housing 11, a plurality of electrical wires 13 (see FIG. 2) that are housed in the housing 11 and connected to the bus bars 12. The plurality of plate-shaped batteries included in the secondary battery B are connected in series via the bus bars 12. The housing 11 is formed by injection molding using a synthetic resin material.

The housing 11 includes a plurality of bus bar housing portions 14 that open upward (in a direction away from the secondary battery), and electrical wire housing portions 15 that also open upward. The plurality of bus bar housing portions 14 are arranged in two rows in the depth direction X. Each bus bar housing portion 14 houses a plate-shaped bus bar 12. Each bus bar housing portion 14 and each bus bar 12 are penetrated by an electrode Ba of a secondary battery B in the height direction Z. The electrodes Ba and the bus bars 12 are connected electrically to each other with fastening by bolts, welding, or the like, which is not shown. In addition, the housing 11 according to this embodiment has an opening/closing hood 16 for covering all of the bus bar housing portions 14 and the electrical wire housing portion 15 simultaneously from above, which is formed in one piece with the housing 11.

The electrical wire housing portions 15, in which the electrical wires 13 connected to the bus bars 12 are housed, are formed inward of the rows of bus bar housing portions 14. The electrical wire housing portions 15 extend in the depth direction X, and are adjacent to the rows of bus bar housing portions 14.

The electrical wire housing portions 15 have a first side wall portion 21 and a second side wall portion 22 that face each other in the width direction Y. The first side wall portion 21 and the second side wall portion 22 are plate-shaped and are perpendicular to the width direction Y. The electrical wire housing portions 15 have a bottom portion 23 that connect the lower ends of the first and second side wall portions 21 and 22. The electrical wire housing portions 15 have a U-shaped cross section constituted of the first and second side wall portions 21 and 22, and the bottom portion 23, with the upper end of the first and second side wall portions 21 and 22 forming an opening in the height direction Z.

The first side wall portion 21 is a wall that separates the bus bar housing portions 14 from the electrical wire housing portion 15. The second side wall portion 22 is provided inward (opposite to the bus bar housing portions 14) of first side wall portion 21 in the width direction Y. A plurality of openings 21a that provide communication between the bus bar housing portions 14 and the electrical wire housing portion 15 are formed in the first side wall portion 21. The electrical wires 13 are connected to the bus bars 12 inside the bus bar housing portions 14 through these openings 21a. The electrical wires 13 connected to the bus bars 12 are routed to an electrical wire guide-out portion 11a of the housing 11 via the electrical wire housing portion 15. Then, the end of each electrical wires 13 guided out from the electrical wire guide-out portion 11a is connected to, for example, a connector portion which is not shown. This connector portion is connected to, for example, an ECU (Electrical Control Unit) for charge control mounted on a vehicle.

On the first side wall portion 21, a cover portion 24 that covers the upper opening of the electrical wire housing portion 15 partially in a longitudinal direction of the electrical wire housing portion 15 (the depth direction X) is formed in one piece with the first side wall portion 21. The cover portion 24 is a rectangular plate that has a side perpendicular to the longitudinal direction of the electrical wire housing portion 15. One side of the cover portion 24 is connected rotatably to the upper end of the first side wall portion 21 with a hinge portion 25. The cover portion 24 is configured to be rotatable between a covering position in which the electrical wire housing portion 15 is covered and an open position in which the electrical wire housing portion 15 is not covered, with the hinge portion 25. Note that FIG. 1 shows the state in which the cover portion 24 is in the open position (open state), and FIG. 2 shows the state in which the cover portion 24 is in the covering position (closed state).

Figure 3:
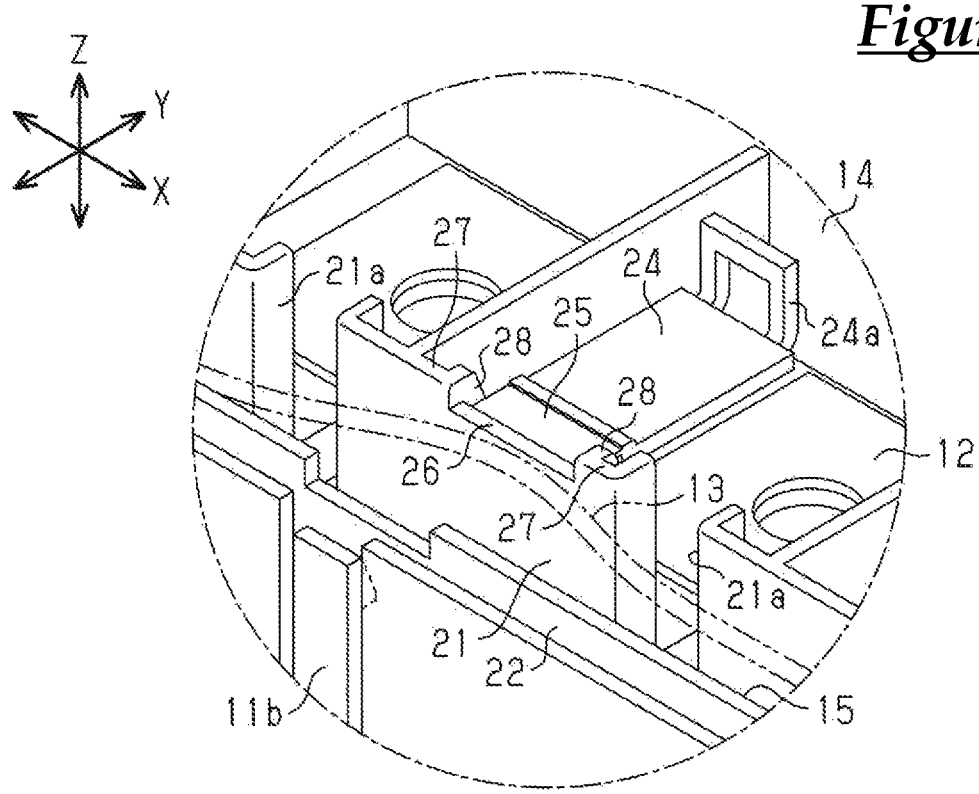
FIG. 3 is a perspective view showing a configuration of a vicinity of a cover portion according to this embodiment.
Figure 4:
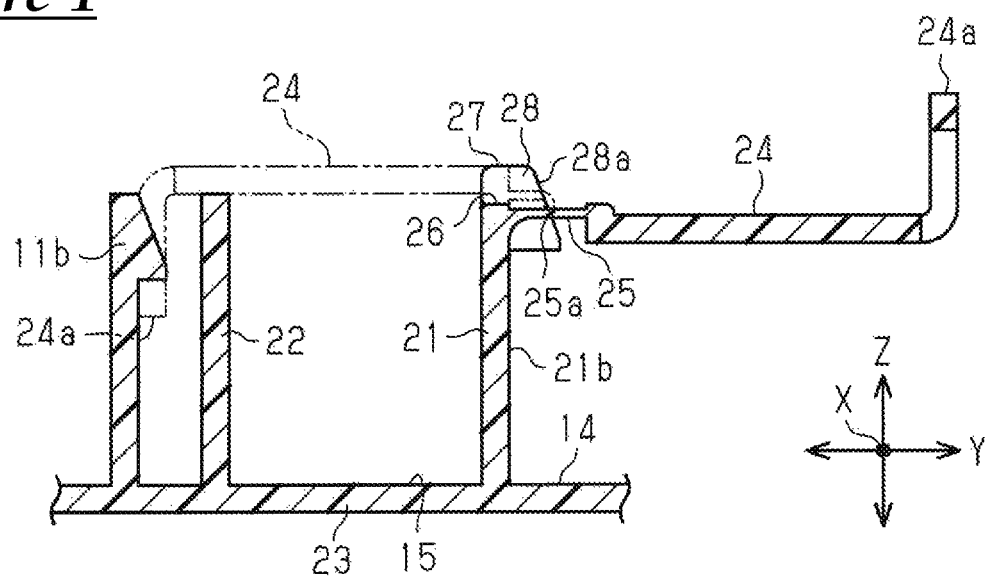
FIG. 4 is a cross-sectional view showing a configuration of a vicinity of a cover portion according to this embodiment.

As shown in FIGS. 3 and 4, the cover portion 24 is a plate which is connected with the hinge portion 25 to the upper end of the first side wall portion 21. The hinge portion 25 is a flexible part whose thickness is thinner than the thickness of the cover portion 24. The hinge portion 25 extends from the outer peripheral surface 21b of the first side wall portion 21 (the side surface on the bus bar housing portion 14 side) in the width direction Y, and its front end in extension direction is connected to the base end of the cover portion 24.

The cover portion 24 is configured to be rotatable about the hinge portion 25 (mainly, a hinge bend point 25a) from the open position to the covering position where the cover portion 24 covers the electrical wire housing portion 15. Note that FIG. 4 shows the open state of the cover portion 24 in which the hinge portion 25 forms a plate perpendicular to the height direction Z, and the hinge bend point 25a in this state is at the center of the hinge portion 25 in the extending direction (the width direction Y).

The cover portion 24 extends from the upper end of the first side wall portion 21 to the upper end of the second side wall portion 22 in the covering position (see the dash-dot-dotted line in FIG. 4). In this covering position, a locking piece 24a formed at the front end of the cover portion 24 is engaged with a locked portion 11b formed in the housing 11. Thereby the cover portion 24 can be held in the covering position. The locked portion 11b is provided in a position inward (opposite to the electrical wire housing portion 15) of the second side wall portion 22 in the width direction Y.

A cover facing surface 26 which faces the cover portion 24 in the covering position in vertical direction (the height direction Z) is provided on the upper end of the first side wall portion 21, a. In this embodiment, the cover facing surface 26 is in a plane perpendicular to the height direction Z, and the cover facing surface 26 and the cover portion 24 in the covering position are in contact with and face each other.

As shown in FIGS. 3 and 4, on the upper end of the first side wall portion 21, a protruding portion 27 that protrudes higher than the cover facing surface 26 (in an opening direction of the electrical wire housing portion 15) is formed on both sides of the cover facing surface 26 in the depth direction X. The protruding portions 27 are adjacent to the cover facing surface 26 in the depth direction X. That is, the protruding portions 27 face the cover portion 24 in the covering position in the depth direction X. In addition, protruding portions 27 face the hinge portion 25 with a gap therebetween in the depth direction X. The protruding portions 27 are formed on the upper end of the first side wall portion 21 extending in the depth direction X, over a range extending from both ends of the cover facing surface 26 in the depth direction X to the opening portions 21a that are nearest to the two sides of the cover facing surface 26. The protruding portions 27 are uniform in height along the depth direction X. The height of the protruding portions 27 is set such that the upper end surface of the protruding portions 27 is flush with the top surface of the cover portion 24 in the covering position.

Each protruding portion 27 has a guiding portion 28 that protrudes from the end adjacent to the cover facing surface 26 toward the bus bar housing portions 14 side in the width direction Y (in the direction away from the electrical wire housing portion 15). An inclined surface 28a is formed on the end surface of each guiding portion 28 in the width direction Y (the tip end surface in the protruding direction). The inclined surface 28a inclines upward (towards the upper end of the protruding portion 27) toward the electrical wire housing portion 15 side. This embodiment is configured such that the point where the inclined surface 28a intersects the upper surface of the hinge portion 25 when viewed in the depth direction X coincides with the hinge bend point 25a.

The following will describe the operative effect of this embodiment.

As shown in FIG. 3, there is a risk that an electrical wire 13 that is housed (routed) along the depth direction X in the electrical wire housing portion 15 will stick out partially from the electrical wire housing portion 15 due to its tendency to bend. In this embodiment, the protruding portions 27 that are provided on both sides of the cover facing surface 26 of the first side wall portion 21 keep the electrical wire 13 from running on the cover facing surface 26. As a result, when the cover portion 24 is rotated to the covering position 24, the electrical wire 13 can be kept from being caught between the cover facing surface 26 and the cover portion 24 or in the hinge portion 25.

Figure 5A:
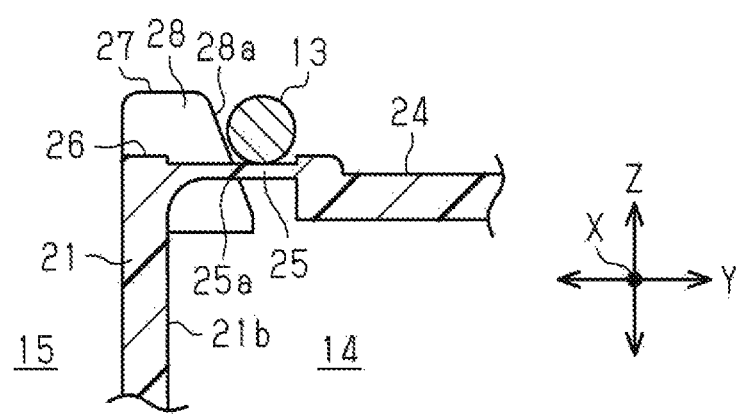
FIGS. 5 (*a*)(*b*)(*c*) are cross-sectional views illustrating how the cover portion according to this embodiment is rotated to a covering position.
Figure 5B:
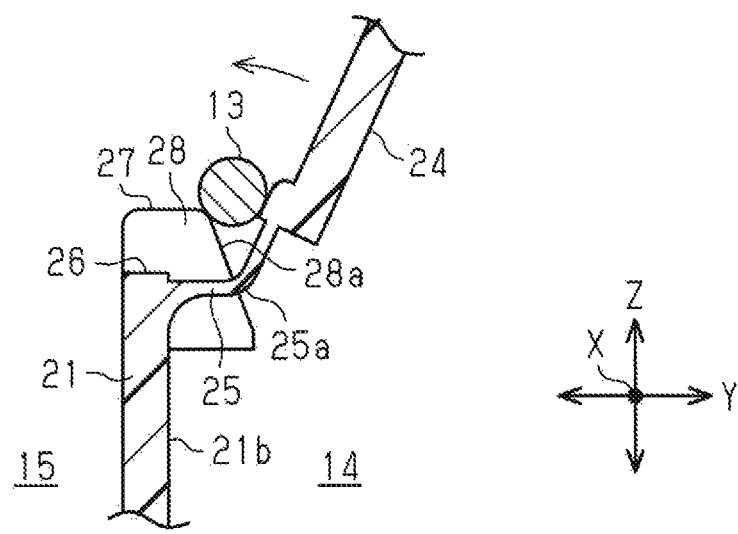
Figure 5C:
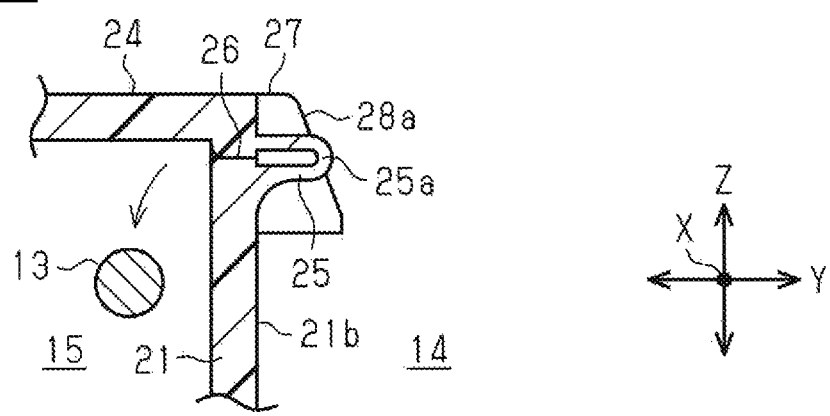

In addition, the case will be described where the electrical wire 13 has jumped over the protruding portion 27 and runs on the hinge portion 25 while the cover portion 24 is open, as shown in FIG. 5(a). When the cover portion 24 is rotated about the hinge bent point 25a toward the covering position in the state where the electrical wire 13 is on the hinge portion 25, as shown in FIG. 5(b), the electrical wire 13 moves along with the cover portion 24 and a part of the rotating hinge portion 25. At this time, the electrical wire 13 is guided along the inclined surface 28a of the guiding portion 28 and moved above the protruding portion 27. After that, the electrical wire 13 is pushed by the cover portion 24 being rotated to the covering position and is housed in the electrical wire housing portion 15 as shown in FIG. 5(c).

Next, the effects of this embodiment will be described.

In order to keep the electrical wire 13 from sticking out of the electrical wire housing portion 15, the cover portion 24 covering partially the upper opening of the electrical wire housing portion 15 is provided in the first side wall portion 21 of the electrical wire housing portion 15 with the hinge portion 25. Moreover, the cover facing surface 26 facing the cover portion 24 in the vertical direction (the height direction Z) in the covering position, and the protruding portions 27 adjacent to the cover facing surface 26 and protruding higher than the cover facing surface 26 are provided on the upper end of the first side wall portion 21. With this configuration, the protruding portions 27 keep the electrical wire 13 from running on the cover facing surface 26, and as a result, when the cover portion 24 is rotated to the covering position 24, the electrical wire 13 can be kept from being caught between the cover facing surface 26 and the cover portion 24, or by the hinge portion 25.

The protruding portions 27 have the guiding portions 28 that guide the electrical wire 13 above the protruding portion 27 when the electrical wire 13 sticking out of the electrical wire housing portion beyond the protruding portion 27 moves along the rotation of the cover portion 24 toward the covering position side. Thus, even if the electrical wire 13 has jumped over the protruding portion 27, the electrical wire 13 can be returned into the electrical wire housing portion 15 without getting caught up, by simply rotating the cover portion 24 to the covering position.

The inclined surface 28a that is inclined upward (towards the upper end of the protruding portion 27) toward the electrical wire housing portion 15 side is formed on the end surface of the guiding portion 28 on the side opposite to the electrical wire housing portion. Thereby, when the electrical wire 13 sticking out of the electrical wire housing portion beyond the protruding portion 27 moves along the rotation of the cover portion 24 to the covering position side, the electrical wire 13 can be easily guided above the protruding portion 27 along the inclined surface 28a, and as a result, the electrical wire 13 can be better kept from being caught up.

The guiding portion 28 extends in the width direction Y at least to a position that coincides with the rotational axis of the hinge portion 25 (the hinge bend point 25a in this embodiment). Thereby, when the electrical wire 13 sticks out of the electrical wire housing portion 15 beyond the protruding portion 27 and is located beyond the rotational axis on the side of the cover portion 24 when the cover portion 24 is in the open state, the electrical wire 13 can be easily guided above the protruding portion 27 by rotating the cover portion 24 to the covering position, and as a result, the electrical wire 13 can be better kept from being caught up.

Note that it is also possible to modify the above-mentioned embodiment as follows.

Although the above-mentioned embodiment is configured such that a point where the inclined surface 28a intersects the upper surface of the hinge portion 25 when viewed in the depth direction X coincides with the hinge bend point 25a, there is no limitation to this configuration. For example, it is also possible to set the extending length of the guiding portion 28 in the width direction Y and the inclination angle of the inclined surface 28a such that the point where the inclined surface 28a intersects the upper surface of the hinge portion 25 viewed in the depth direction X is positioned on the opposite side, with respect to the electrical wire housing portion, of the hinge bend point 25a.

In the above-mentioned embodiment, although the cover portion 24 in the covering position faces the cover facing surface 26 in contact in the height direction Z, there is no limitation to this configuration, and the cover portion 24 in the covering position may also face the cover facing surface 26 across a gap in the height direction Z.

In the above-mentioned embodiment, in the first and second side wall portions 21 and 22 that constitute the electrical wire housing portion 15, the cover portion 24 is provided in one piece with the first side wall portion 21 that separates the electrical wire housing portion 15 from the bus bar housing portion 14 with the hinge portion 25. However, there is no limitation to this configuration, and it is also possible to provide the cover portion 24 in one piece with the second side wall portion 22 with a hinge portion. In this case, the cover facing surface 26 and the protruding portion 27 are provided on the upper end of the second side wall portion 22.

In the above-mentioned embodiment, it is also possible to arrange a plurality of the cover portions 24 spaced apart in the longitudinal direction of the electrical wire housing portion 15 (in the depth direction X).

In the above-mentioned embodiment, the locked portion 11b that engages with the locking piece 24a of the cover portion 24 is provided in a position that is inward (opposite of the electrical wire housing portion 15) of the second side wall portion 22 in the width direction Y. However, there is no limitation to this configuration, and for example, it is also possible to form the locked portion 11b on the outer surface of the second side wall portion 22.

The configuration of the housing 11 is not limited to the above-mentioned embodiments, and may also be modified as appropriate. For example, in the above-mentioned embodiment, the electrical wire housing portions 15 are provided inward of the rows of the bus bar housing portions 14 in the width direction Y. However, there is no limitation to this configuration, and the electrical wire housing portions 15 can also be provided outward of the rows of bus bar housing portions 14 in the width direction Y.

The above-described embodiments and modifications can be combined as appropriate.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Battery Wiring Module
11: Housing
13: Electrical Wire
15: Electrical Wire Housing Portion
21: First Side Wall Portion
22: Second Side Wall Portion
24: Cover Portion
25: Hinge Portion
25a: Hinge Bend Point (Rotational Axis)
26: Cover Facing Surface
27: Protruding Portion
28: Guiding Portion
28a: Inclined Surface
B: Secondary Battery

What is claimed is:

1. A battery wiring module comprising:
a housing to be attached to a secondary battery for a vehicle, the housing including:
an electrical wire housing portion including a first side wall portion and a second side wall portion that face each other, an electrical wire being housed between the first side wall portion and the second side wall portion, and
a cover portion that is provided to the first side wall portion with a hinge portion, the cover portion being rotatable about the hinge portion to a covering position in which the cover portion reaches from an upper end of the first side wall portion to an upper end of the second side wall portion, partially covering the electrical wire housing portion,
wherein the upper end of the first side wall portion is provided with a cover facing surface that faces the cover portion in the covering position in the vertical direction, and a protruding portion that is adjacent to the cover facing surface and that protrudes higher than the cover facing surface,
wherein the protruding portion includes a guiding portion configured to guide the electrical wire, when the electrical wire sticks out of the electrical wire housing portion beyond the protruding portion, above the protruding portion by moving the electrical wire along the rotation of the cover portion to the covering position side, and
wherein an inclined surface that is inclined upward toward the electrical wire housing portion side is formed on an end surface of the guiding portion on a side opposite to the electrical wire housing portion.

2. A battery wiring module comprising:
a housing to be attached to a secondary battery for a vehicle, the housing including:
an electrical wire housing portion including a first side wall portion and a second side wall portion that face each other, an electrical wire being housed between the first side wall portion and the second side wall portion, and
a cover portion that is provided to the first side wall portion with a hinge portion, the cover portion being rotatable about the hinge portion to a covering position in which the cover portion reaches from an upper end of the first side wall portion to an upper end of the second side wall portion, partially covering the electrical wire housing portion,
wherein the upper end of the first side wall portion is provided with a cover facing surface that faces the cover portion in the covering position in the vertical direction, and a protruding portion that is adjacent to the cover facing surface and that protrudes higher than the cover facing surface,
wherein the protruding portion includes a guiding portion configured to guide the electrical wire, when the electrical wire sticks out of the electrical wire housing portion beyond the protruding portion, above the protruding portion by moving the electrical wire along the rotation of the cover portion to the covering position side, and wherein the guiding portion extends away from the electrical wire housing portion to a position that coincides with the rotational axis of the hinge portion, or a position beyond the rotational axis in the direction.

* * * * *